US009061728B2

(12) United States Patent
Galstad et al.

(10) Patent No.: US 9,061,728 B2
(45) Date of Patent: Jun. 23, 2015

(54) BICYCLE HANDLEBAR AND GRIP ASSEMBLY

(75) Inventors: Ryan Galstad, Lake Mills, WI (US);
Jeffrey R. Staszak, Deerfield, WI (US);
Michael Leighton, Watertown, WI (US);
Allen Hu, Taichung (TW)

(73) Assignee: Trek Bicycle Corporation, Waterloo, WI (US)

( * ) Notice: Subject to any disclaimer, the term of this patent is extended or adjusted under 35 U.S.C. 154(b) by 719 days.

(21) Appl. No.: 13/044,643

(22) Filed: Mar. 10, 2011

(65) Prior Publication Data

US 2011/0219909 A1 Sep. 15, 2011

Related U.S. Application Data

(60) Provisional application No. 61/313,536, filed on Mar. 12, 2010.

(51) Int. Cl.
*B62K 21/26* (2006.01)
*B62K 21/12* (2006.01)

(52) U.S. Cl.
CPC ........... *B62K 21/26* (2013.01); *Y10T 29/49826* (2015.01); *Y10T 74/20828* (2015.01); *B62K 21/12* (2013.01)

(58) Field of Classification Search
USPC .......... 74/551.1, 551.2, 551.8, 551.9; 16/421, 16/436; 267/140.11; 173/162.2
See application file for complete search history.

(56) References Cited

U.S. PATENT DOCUMENTS

| | | | |
|---|---|---|---|
| 592,634 A * | 10/1897 | Lampert | 74/551.2 |
| 594,231 A * | 11/1897 | Copeland | 74/551.9 |
| 2,984,210 A * | 5/1961 | Fuehrer | 173/162.2 |
| 4,380,093 A | 4/1983 | Morgan | |
| 4,522,083 A | 6/1985 | Morgan | |
| 4,739,674 A | 4/1988 | Hori | |
| 4,934,024 A | 6/1990 | Sexton | |
| 4,964,192 A | 10/1990 | Marui | |
| 5,110,653 A | 5/1992 | Landi | |
| 5,146,809 A | 9/1992 | Ruana | |
| 5,155,878 A | 10/1992 | Dellis | |

(Continued)

FOREIGN PATENT DOCUMENTS

| | | |
|---|---|---|
| EP | 0156387 | 11/1990 |
| EP | 0429408 A1 | 1/1991 |

(Continued)

OTHER PUBLICATIONS

European Search Report (EP Application No. 11158027.0)—8 pages.

(Continued)

*Primary Examiner* — Thomas Diaz

(57) ABSTRACT

A bicycle handlebar assembly that includes a body having at least two grip areas positioned for interaction with the hands of a rider. The grip portions or grip areas are preferably spaced apart by a center portion that secures the assembly to a bicycle steerer tube. A channel or detent is formed in the body proximate at least one, and preferably proximate each grip portion or grip area. A dampener formed of a different material than the body is disposed in the detent and dissipates at least a portion of vibration of the body to reduce vibrations communicated to the hands of the rider from handlebar vibration. An optional grip assembly cooperates with the handlebar assembly and is constructed to further dampen handlebar vibration.

10 Claims, 10 Drawing Sheets

(56) References Cited

U.S. PATENT DOCUMENTS

| | | |
|---|---|---|
| 5,170,532 A | 12/1992 | Holmin et al. |
| 5,267,487 A | 12/1993 | Falco et al. |
| 5,766,720 A | 6/1998 | Yamagishi et al. |
| 5,944,617 A | 8/1999 | Falone et al. |
| 6,263,759 B1 * | 7/2001 | Hollingsworth et al. .... 74/551.9 |
| 6,546,827 B2 | 4/2003 | Irie |
| 6,648,535 B2 | 11/2003 | Ferrara, Jr. |
| 6,872,157 B2 | 3/2005 | Falone et al. |
| 6,893,366 B2 | 5/2005 | Falone et al. |
| 6,974,626 B2 | 12/2005 | Horacek |
| 7,004,655 B2 | 2/2006 | Ferrara |
| 7,254,840 B2 | 8/2007 | Hammons et al. |
| 2003/0040384 A1 | 2/2003 | Falone et al. |
| 2003/0226421 A1 | 12/2003 | Livingston |
| 2003/0228818 A1 | 12/2003 | Vito et al. |
| 2004/0068844 A1 | 4/2004 | Lumpkin |
| 2005/0257978 A1 | 11/2005 | Sigfrid |
| 2006/0206977 A1 | 9/2006 | Hammons et al. |
| 2007/0157758 A1 | 7/2007 | Shih |
| 2008/0034915 A1 | 2/2008 | Bigolin |
| 2008/0072702 A1 * | 3/2008 | Arnold ........................ 74/551.9 |
| 2008/0196540 A1 * | 8/2008 | Wu ............................. 74/551.9 |
| 2009/0035543 A1 | 2/2009 | Vito et al. |
| 2009/0044658 A1 * | 2/2009 | Yen ............................. 74/551.1 |
| 2009/0124408 A1 | 5/2009 | Schroder |

FOREIGN PATENT DOCUMENTS

| | | | |
|---|---|---|---|
| EP | 1882560 A3 | 2/2008 | |
| EP | 2003050 A1 | 12/2008 | |
| JP | 2000/279557 A | 10/2000 | |
| JP | 2003/081168 A | 3/2003 | |
| JP | 2009040252 A * | 2/2009 | ............ B62K 21/26 |
| WO | WO 92/01596 | 2/1992 | |
| WO | WO 03/018144 A1 | 3/2003 | |
| WO | WO 03/066174 A1 | 8/2003 | |
| WO | WO 2008/104409 A1 | 9/2008 | |

OTHER PUBLICATIONS

European Partial Search Report (EP Application No. 11158027.0)—6 pages.

* cited by examiner

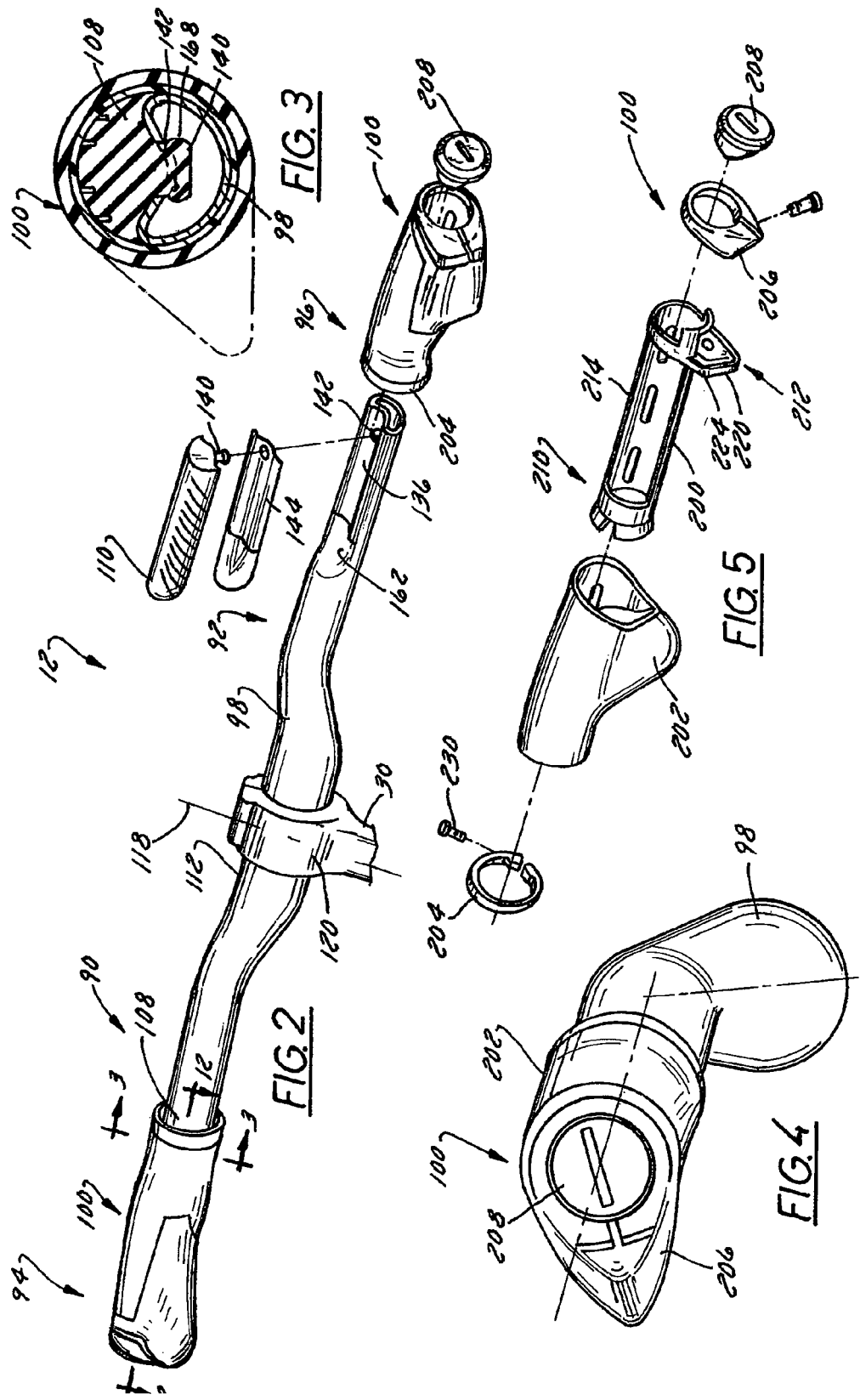

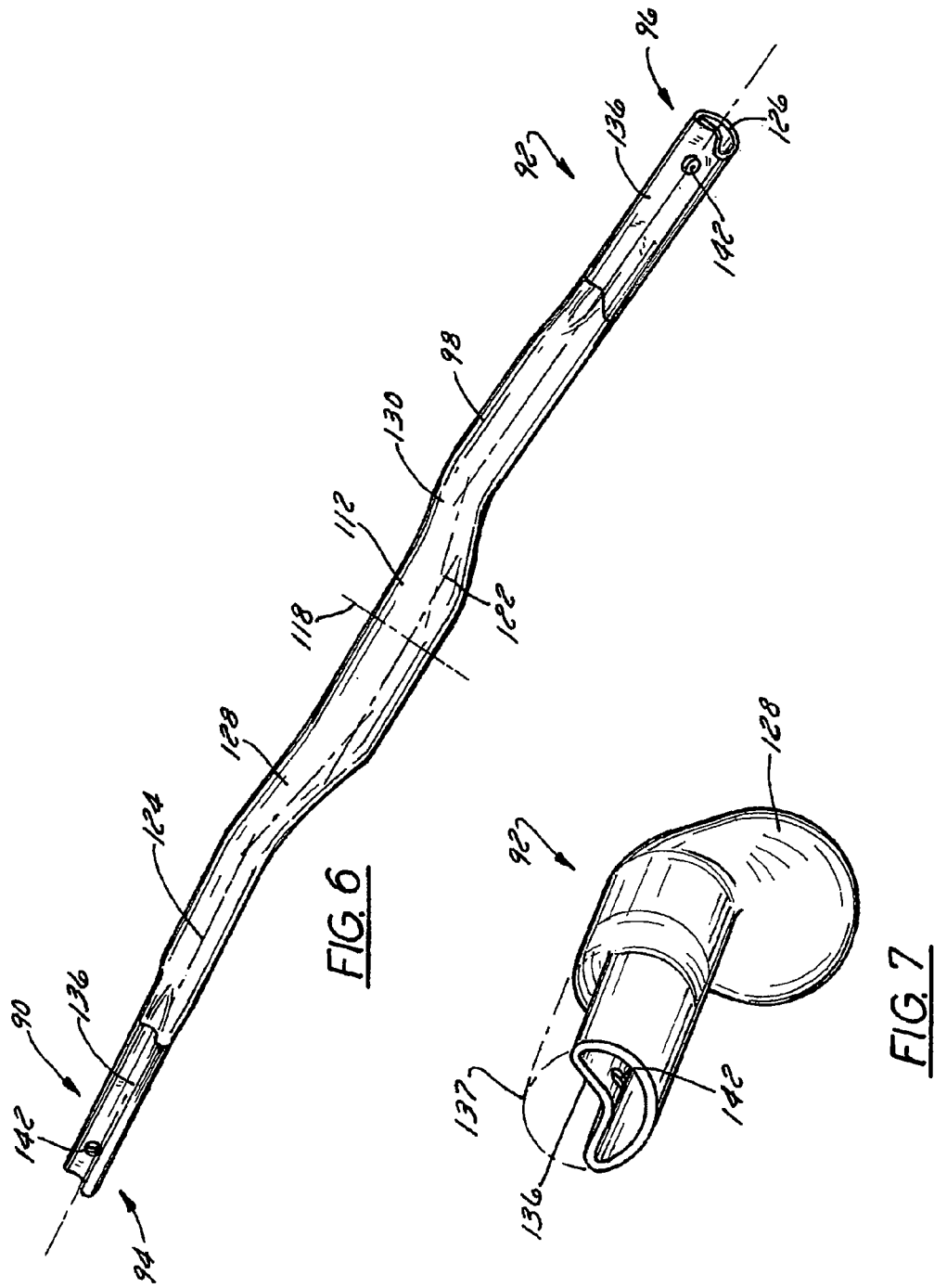

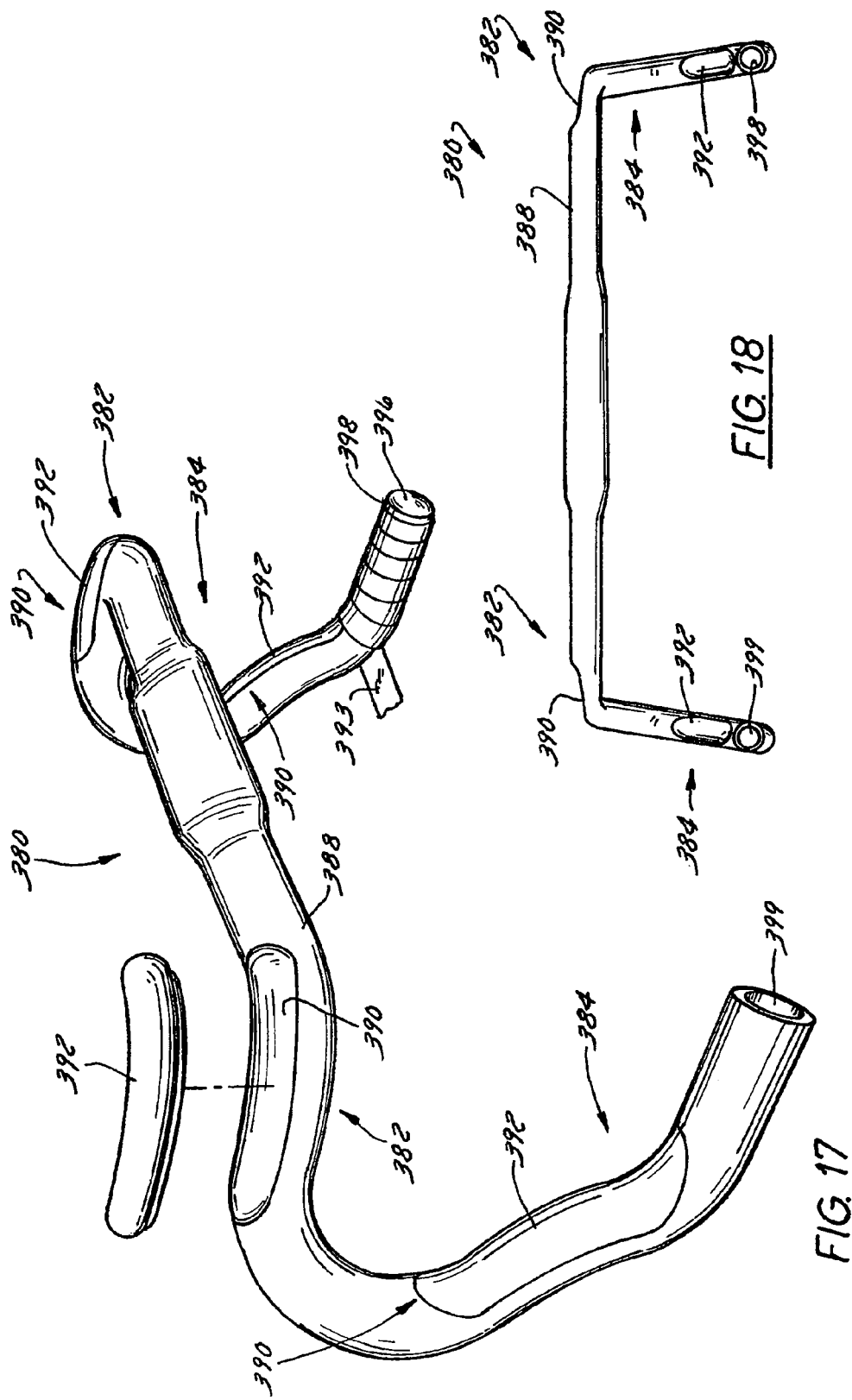

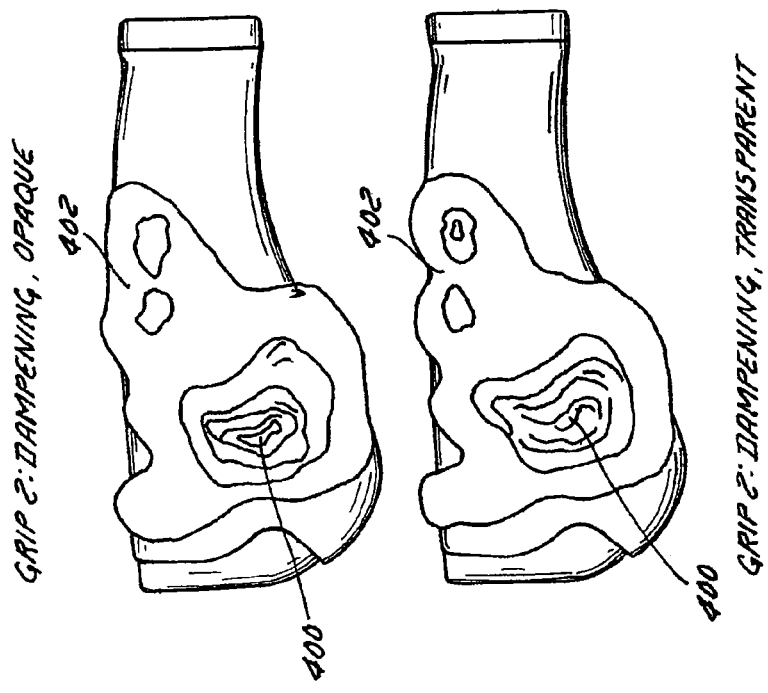
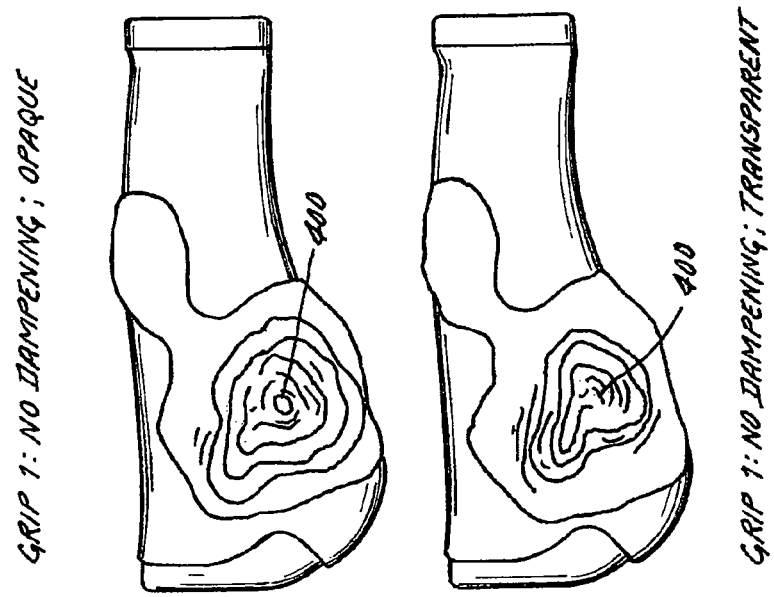
FIG. 19

BICYCLE HANDLEBAR AND GRIP ASSEMBLY

CROSS-REFERENCE TO RELATED APPLICATIONS

This application claims priority to U.S. Provisional Patent Application Ser. No. 61/313,536 titled "Bicycle Handlebar And Grip Assembly" which was filed on Mar. 12, 2010 and the disclosure of which is expressly incorporated herein.

BACKGROUND OF THE INVENTION

The present invention relates generally to bicycles and, more particularly, to a bicycle handlebar and bicycle grip assemblies that dampen and isolate a rider from vibrations associated with operation of the bicycle.

Handlebar grips are a common accessory on bicycles. Handlebar grips allow a user to more comfortably control and interact with the handlebar to manipulate the front wheel to steer the bicycle and to maintain control of the bicycle. Handlebar grip assemblies, particularly those used on off-road or mountain bicycles are preferably soft on the outside so that they can be held with sufficient pressure to maintain control of the bicycle without irritating the rider's hands when the bicycle is ridden over rough terrain. Although many different manufacturers provide a wide variety of grip configurations, there are a number of bicycles whose construction limits the use of such widely available padded grip assemblies.

Bicycles intended to be ridden upon paved surfaces, commonly referred to as road bikes, are provided with a generally curvilinear handlebar assembly. Such handlebars provide various grip positions so that a rider can periodically adjust the position of their torso to reduce fatigue and improve aerodynamic function Commonly, such handlebars allow the rider to maintain a "tuck" position and a slightly more upright, but still forward inclined portion. Unfortunately, such handlebar assemblies commonly have distal ends that are ill-positioned for use with many of the known padded grip assemblies. In an effort to reduce agitation of the rider's hands caused by interaction with such handlebars, many riders/manufacturers commonly wrap such handlebars with grip tape and/or padded, leather, or foam type tapes to improve the ability of the rider to grip such bars. Even with such wraps, there is a desire to provide a handlebar assembly that dampens vibration and/or otherwise better isolates a rider from the handlebar vibrations associated with bicycle operation.

Many off-road bicycles or mountain bicycles are equipped with a fairly robust and generally straight shaped handlebar. Such handlebars are shaped and constructed to withstand vigorous rider interaction associated with off-road riding. Although such handlebars can conveniently cooperate with any of a number of grip assemblies, such handlebar assemblies relegate vibration isolation or shock dampening performance to the bicycle steerer assembly or to a grip assembly secured to the handlebar. Providing a vibration dampening steerer assembly substantially increases the complexity and the cost associated with the steerer assembly and also increases the weight of the resultant bicycle assembly. With respect to aftermarket or other supplemental handlebar grip assemblies, such grip assemblies are commonly rigidly secured to the handlebar. Unfortunately, many of the mounting arrangements of such supplemental grip assemblies also result in at least partial undesirable communication of the vibration of the handlebar to the hands of the rider via the grip assembly. Furthermore, such grip assemblies must also be provided with a robust construction to withstand the vibration of the handlebar and the user interaction therewith. Accordingly, such an assembly unnecessarily increases the overall weight of the handlebar assembly and only minimally offsets the detriments of handlebar vibration.

Therefore, there is a need to provide a handlebar assembly, handlebar and grip assembly, and/or grip assembly constructed to absorb and/or dissipate a portion of the vibration associated with bicycle operation. There is a need for a bicycle handlebar, handlebar and grip, and/or grip assembly that better isolates the rider from the vibrations associated with interaction with the steering assembly during operation of the bicycle. It would also be desirable to provide a handlebar and grip, and/or grip assembly that is both robust and lightweight and which dampens vibration associated with bicycle operation. It is further desired to provide a bicycle handlebar and grip assembly wherein both the handlebar and the grip assembly each reduce or limit vibrations communicated to a rider via the steering control assembly.

BRIEF DESCRIPTION OF THE INVENTION

The present invention provides a bicycle handlebar and bicycle grip assembly that overcomes the aforementioned drawbacks. One aspect of the invention discloses a bicycle handlebar assembly having a dampener that absorbs a portion of the vibration of the body of the handlebar. Another aspect of the invention discloses a grip assembly that cooperates with the handlebar assembly and further dampens vibration of the handlebar assembly and reduces the transmission of such vibration to the rider.

A handlebar assembly according to another aspect of the invention useable with one or more of the above aspects includes a handlebar body formed of a first material that extends from a first distal end to a second distal end. A first grip portion and a second grip portion are formed toward opposite ends of the body. The body includes a clamp portion that is positioned longitudinally between the first grip portion and the second grip portion. The clamp portion is constructed to engage a steerer clamp. A channel is formed along a portion of at least one of the first grip portion and the second grip portion. A dampener that is formed of a material that is more pliable than the material of the handlebar body is disposed in the channel and dampens vibration of the body.

Another aspect of the invention discloses a bicycle handlebar assembly that is combinable with one or more of the aspects described above. The handlebar assembly includes a first grip portion and a second grip portion positioned opposite the first grip portion. The handlebar assembly includes a center portion that connects an inboard end of each of the first grip portion and the second grip portion and that longitudinally spaces the first grip portion and the second grip portion. The center portion is constructed to be secured to a steerer tube. A detent extends along at least a portion of each of the first grip portion and the second grip portion. A vibration dampener is disposed in each detent and is shaped to cooperate with the detent to provide a generally continuous cross-sectional shape along a longitudinal length of each respective grip portion. Such a construction allows a variety of grip assemblies, including a grip wrap, to be positioned about the handlebar assembly proximate the respective grip portions. In a preferred aspect, the grip assembly includes an opening that is configured to be aligned with the vibration dampener so that the rider can directly or indirectly interact with the dampener but so that no rigid structure is disposed between the rider and the dampener.

Another aspect of the invention that is useable with one or more of the aspects above is a grip assembly that fits over a grip portion of the handlebar assembly. The grip assembly includes a core that fits over the handlebar. A first clamp and a second clamp cooperate with the opposite ends of the core and secure the core with respect to the handlebar. The grip assembly includes a grip body that is formed of an elastomer material and overlies a majority of the core. An opening is formed in a portion of the core and exposes a portion of an inside surface of the grip pad to the handlebar. When the grip assembly is attached to a handlebar having a dampener, the opening aligns with the dampener so that the dampener and the grip pad both reduce vibrations communicated to a hand of a rider.

Another aspect of the invention that is useable or can be combined with one or more of the above aspects discloses a method of isolating a bicycle rider from handlebar vibration. The method includes forming a handlebar that is securable to a bicycle and shaped to be gripped by a user. A detent is formed in the handlebar proximate at least one area of common interaction with a hand of a user of a bicycle and is populated with a dampener that is formed of material that is more pliable than a material of the handlebar. Such a construction provides a handlebar assembly that is robust to allow control of the bicycle during vigorous riding but provides vibration isolation relative to the hands of the rider.

These and various other features and advantages of the present invention will be made apparent from the following detailed description and the drawings.

BRIEF DESCRIPTION OF THE DRAWINGS

The drawings illustrate one preferred embodiment presently contemplated for carrying out the invention.

FIG. 2 is a perspective view of the handlebar and grip assembly shown in FIG. 1 with the grip assembly and handlebar dampener of one grip portion exploded from the handlebar assembly;

FIG. 3 is a lateral cross-section view of the handlebar assembly and grip assembly taken along line 3-3 shown in FIG. 2;

FIG. 4 is an elevation view of an assembled end of the handlebar assembly and grip assemblies shown in FIG. 2;

FIG. 5 is an exploded perspective view of the grip assembly shown in FIG. 2;

FIG. 6 is a perspective view of a body of the handlebar assembly shown in FIG. 2;

FIG. 7 is a view similar to FIG. 4 with the grip assembly and handlebar dampener removed from the body of the handlebar;

FIG. 17 is a perspective view of a handlebar assembly according to another embodiment of the invention with one vibration dampener exploded from the handlebar assembly;

FIG. 18 is an elevational view of the handlebar assembly shown in FIG. 17; and

FIG. 19 is a graphical representation showing a grip pressure concentration plot during testing of various handlebar and grip assembly configurations.

DETAILED DESCRIPTION OF THE PREFERRED EMBODIMENT

Figure 1:
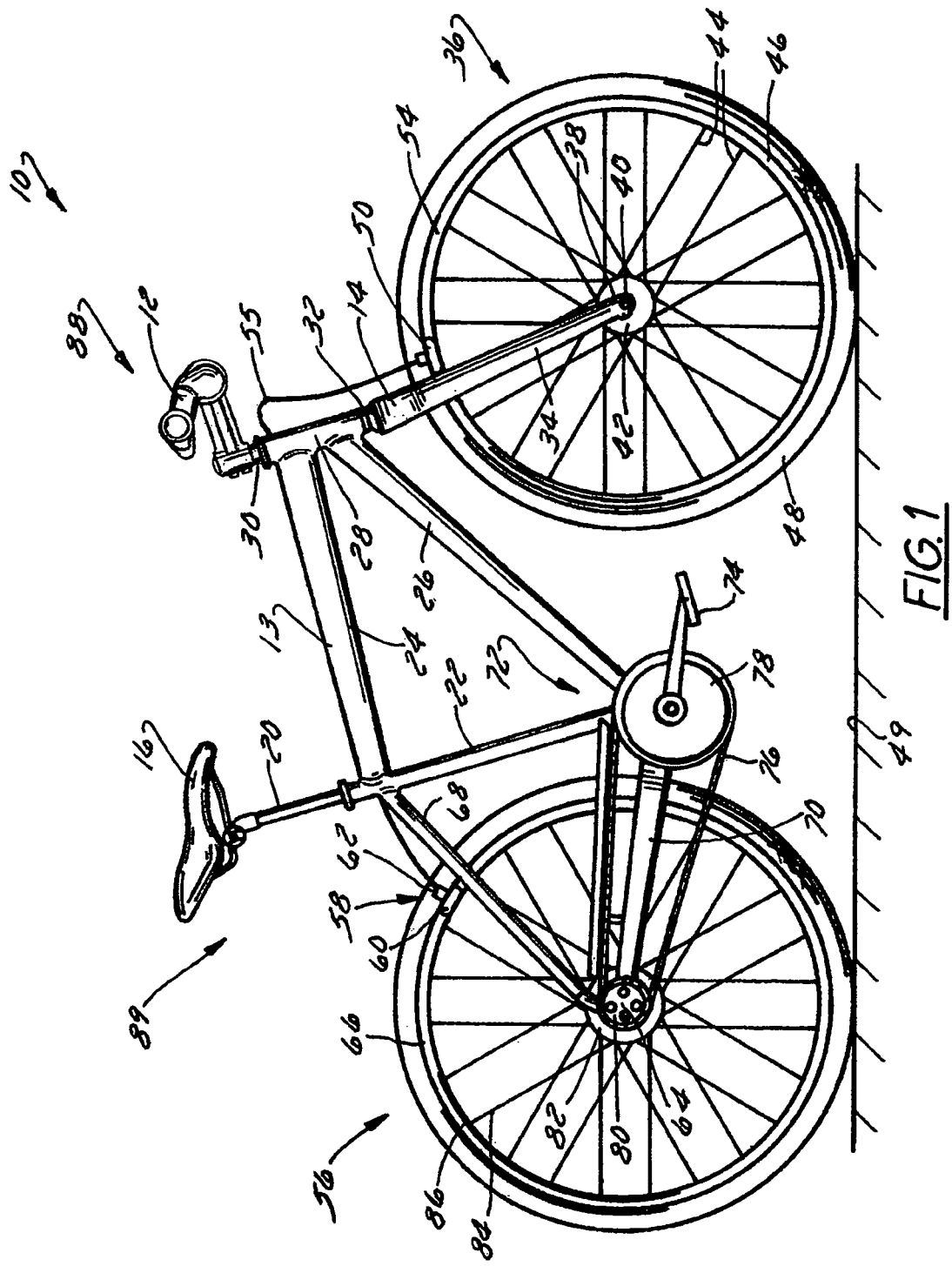
FIG. 1 is a side elevation view of a bicycle equipped with a handlebar assembly and a grip assembly according to the present invention.

FIG. 1 shows an exemplary bicycle 10 equipped with a handlebar or a handlebar assembly 12 according to one embodiment of the present invention. Handlebar assembly 12 is connected to a fork or steerer assembly 14 of bicycle 10 and is rotatable relative to bicycle 10 to effectuate steering of the bicycle. Handlebar assembly 12 and a seat 16 are attached to a frame 13 of bicycle 10. A seat post 20 is connected to seat 16 and slidably engages a seat tube 22 of frame 13. A top tube 24 and a down tube 26 extend in a forward direction from seat tube 22 to a head tube 28 of frame 13. Handlebar assembly 12 is rigidly connected to a stem or steerer tube 30 that passes through head tube 28 and is secured or otherwise attached to a fork crown 32 of steerer assembly 14. Handlebar assembly 12 is rotatably attached to bicycle 10 such that handlebar assembly 12 and fork crown 32 rotate about a longitudinal axis of steerer tube 30.

Steerer assembly 14 includes a pair of forks, fork blades or fork legs 34 that extend from generally opposite lateral sides of fork crown 32. Fork legs 34 support a front wheel assembly 36 at an end thereof or dropout assembly 38. Dropout assemblies 38 engage generally opposite sides of an axle 40 that is engaged with a hub 42 of front wheel assembly 36. A number of spokes 44 extend from hub 42 to a rim 46 of front wheel assembly 36. A tire 48 is engaged with rim 46 such that rotation of hub 42 and rim 46, relative to fork legs 34, rotates tire 48 relative to a ground surface 49. As is commonly understood, side to side rotation of handlebar assembly 12 turns front wheel assembly 36 in a lateral direction to facilitate steering of bicycle 10.

Bicycle 10 includes a front brake assembly 50 that is operationally connected to an actuator that is attached to handlebar assembly 12 at a location proximate interaction of the rider's hands with handlebar assembly 12. The brake assembly includes a pair of brake pads that are positioned on generally opposite lateral sides of front wheel assembly 36. The brake pads selectively engage a brake wall 54 of rim 46 and thereby provide a stopping or slowing force to front wheel assembly 36. The brake pads are attached to a caliper assembly that is operationally connected to the handlebar supported actuator by a brake cable 55 or other flexible driving member, such as a fluid connection member. It is further appreciated that although brake assembly 50 is shown as what is commonly understood as a rim brake, brake assembly 50 could alternatively be configured as a disk brake system wherein the brake assembly is positioned nearer the hub of the wheel assembly and interacts with a disk secured thereat. Examples of both such systems are fairly common in the art.

Still referring to FIG. 1, bicycle 10 includes a rear wheel assembly 56 that is also equipped with a brake assembly 58.

Brake assembly 58 includes a pair of brake pads 60 that are manipulated by a caliper 62 that extends about generally opposite lateral sides of rear wheel assembly 56. Rear wheel assembly 56 includes a rear wheel 66 that is supported by a rear axle 64. Rear wheel brake assembly 58 interacts with rear wheel 66 in a manner similar to the association of the front brake assembly and front wheel assembly 36. Those skilled in the art will appreciate that front and rear brake assemblies 50, 58 are merely exemplary of one brake assembly useable with bicycles 10. It is appreciated that either or both of front and rear wheel assemblies 36, 56 could be provided with other braking arrangements such as disc brake assemblies as discussed above.

Axle 64 of rear wheel assembly 56 is offset from a crankset 72 by one or more seat stays 68 and chain stays 70. Crankset 72 includes a set of pedals 74 that is operationally connected to a flexible drive member such as a chain 76 via a gear set, chain ring, or sprocket 78. Rotation of chain 76 communicates a drive force to a gear cluster 80 positioned proximate rear axle 64. Gear cluster 80 is generally concentrically orientated with respect to rear axle 64 and includes a number of variable diameter gears.

Gear cluster 80 is operationally connected to a hub 82 of rear wheel 66. A number of spokes 84 extend radially between hub 82 and a rim 86 of rear wheel 66 of rear wheel assembly 56. As is commonly understood, rider operation of pedals 74 drives chain 76 thereby driving rear wheel 66 which in turn propels bicycle 10. Steerer assembly 14 supports a forward end 88 and rear wheel assembly 56 supports a rearward end 89 of bicycle 10 above ground surface 49. Handlebar assembly 12 is connected to frame 13 and steerer assembly 14 such that rider manipulation of handlebar assembly 12 is communicated to steerer assembly 14 to facilitate turning of front wheel assembly 36 relative to frame 13 with respect to a longitudinal axis of bicycle 10. As is commonly understood, such manipulation of handlebar assembly 12 steers bicycle 10 during riding.

Understandably, the construction of bicycle 10 shown in FIG. 1 is merely exemplary of a number of bicycle configurations. That is, whereas bicycle 10 is shown as what is commonly understood as cross-over or multi-purpose bicycle, it is appreciated that handlebar assembly 12 is useable with other bicycle configurations such as bicycles intended to be ridden on only paved surfaces, commonly referred to a street or road bike, as well as off-road, hybrid, mountain, and/or dirt bikes, commonly configured to be primarily ridden on unpaved surfaces, as well as cross-over bicycle configurations that are configured to be ridden on both paved and unpaved surfaces. Regardless of the configuration of bicycle with respect to the intended riding surface, vibrations associated with bicycle operation can be communicated to the rider via the rider interaction with the handlebar. Handlebar assembly 12 is configured to limit or reduce the communication and localized magnitude of such vibrations to the hands of the rider.

FIGS. 2-9 show handlebar assembly 12 with a left hand optional supplemental grip assembly 100 secured to the handlebar assembly 12 and a right hand optional supplemental grip assembly 100 exploded therefrom. It is appreciated that the respective left and right hand optional grip assemblies 100, 102 are generally mirror images of one another. Handlebar assembly 12 is constructed to cooperate any of a number of grips such optional palm grip assemblies 100 and/or other grips such as wraps, as explained further below with respect to FIGS. 17 and 18, that are simply wound around the body of the respective handlebar assembly 12. Still referring to FIGS. 2, 6, and 7, handlebar assembly 12 includes a first grip portion or grip site 90 and a second grip portion of grip site 92 that are positioned proximate generally opposite longitudinal ends 94, 96 of an elongated body 98 of handlebar assembly 12.

Handlebar assembly 12 includes a pair of dampeners 108, 110 are each secured to body 98 of handlebar assembly 12 proximate one of first and second grip sites 90, 92. Body 98 includes a center portion 112 that is generally centrally disposed and connects the oppositely extending grip portions 90, 92. Body 98 has a generally elongated shape whose cross-sectional area preferably generally decreases in opposite directions away from a longitudinal midpoint, indicated by line 118, of body 98. Center portion 112 of body 98 is constructed to cooperate with a clamp assembly 120 associated with steerer tube 30. Center portion 112 includes a longitudinal axis, indicated by line 122, that is oriented in an offset and crossing direction with respect to a longitudinal axis 124, 126 associated with each of grip sites 90, 92, respectively. Grip sites 90, 92 preferably extend in an upward and rearward direction-toward a rider with respect to center portion 112 of body 98 when handlebar assembly 12 is secure to an underlying bicycle. Preferably, a transition portion 128, 130 is formed between center portion 112 and each grip site 90, 92 and fluidly connects center portion 112 to each grip portion 90, 92 of body 98. Transition portions 128, 130 provide a generally smooth and continuous gradual reduction in the cross-sectional area of body 98 between center portion 112 and each of the respective grip sites 90, 92 in a lateral outward direction relative to longitudinal midpoint 118.

Each grip site 90, 92 of body 98 includes a detent or channel 136 that extends in a longitudinal direction along body 98 at one or more locations of body 98 where a rider's hand is intended to interact with handlebar assembly 12 or at each intended grip site. Each channel 136 receives a dampener 108, 110. As shown in FIG. 3, dampeners 108, 110 are preferably shaped to generally complete the tubular circular cross-sectional shape, indicated by line 137 (FIG. 7) of grip sites 90, 92 of handlebar body 98. Each dampener 108, 110 can include an optional nipple 140 that cooperates with an opening 142 formed in a respective channel 136. Nipple 140 is constructed to cooperate with opening 142 of channel 136 to at least partially secure and preferably orient or index a respective dampener 108, 110 relative to handlebar bar body 98. Alternatively, an optional adhesive insert 144, such as a two-sided adhesive material or other bonding agent, can be disposed between the respective dampener 108, 110 and handlebar body 98. Preferably, insert 144 is provided as two-sided tape that provides securing along an entire underside of each dampener 108, 110 with body 98. Understandably, glue or another adhesive agent could be used to secure each dampener 108, 110 with respect to a corresponding channel 136. In one aspect, each optional insert 144 includes an opening 148 that cooperates with nipple 140 so as to orient each insert 144 and dampener 110 relative to a respective channel 136.

Figure 14:
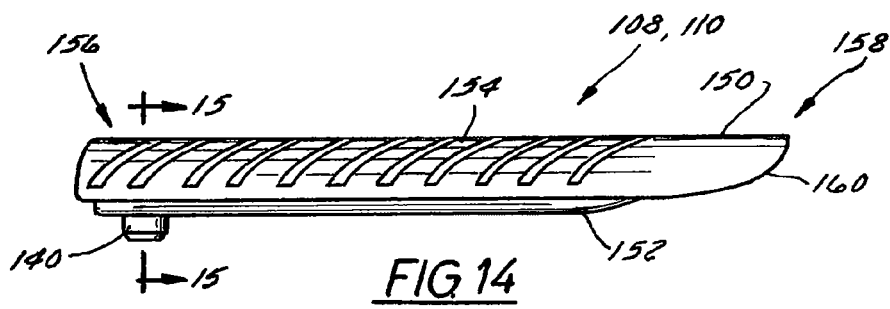
FIG. 14 is an elevational view of a handlebar dampener of the handlebar assembly shown in FIG. 2.
Figure 15:
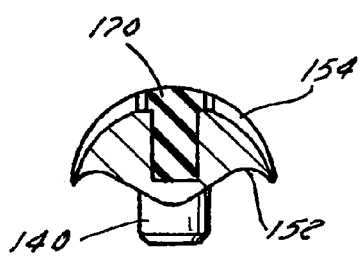
FIG. 15 is a cross-sectional view of the dampener shown in FIG. 14 taken along line 15-15.

As best shown in FIGS. 14 and 15, each dampener 108, 110 includes an elongated body 150 that is formed of an elastomeric material having a desired durometer. Each dampener body 150 includes a bar side 152 and a hand side 154. Each bar side 152 of a respective dampener 108, 110 is shaped to substantially correspond to the shape of the corresponding groove or channel 136 formed in body 98 of handlebar assembly 12. Preferably, a mostly or entirely continuous interface surface is formed between each dampener body 150 and handlebar body 98. Body 150 includes a distal or outboard end 156 and an inboard end 158. The outboard direction refers to the right and left side lateral directions that face away from a longitudinal centerline of bicycle 10 whereas inboard directions refer to those directions that originate at the right and left hand outboard locations and are directed toward the longitudinal centerline of bicycle 10.

Inboard end 158 of bar side 152 of dampener body 150 includes a tapered end 160 that corresponds to a shape and length of a corresponding tapered portion 162 (FIG. 2) of a respective channel 136 of handlebar body 98. The mating shape of dampener body 150 and channel 136 provides for a snug and conductive interaction between handlebar body 98 and each dampener body 150. Optional nipple 140 extends from bar side 152 of dampener body 150 proximate outboard end 156. As shown in FIG. 3, nipple 140 interacts with opening 142 formed in handlebar body 98 to slightly deform nipple 140 when the nipple is introduced to opening 142. Such interaction creates a bulge 168 on nipple 140 at a location inside handlebar body 98. When provided with option nipple 140, bulge 168 secures a respective dampener 108, 110 relative to handlebar body 98. Alternatively, an optional fastener 170 (FIG. 15) could be provided that deforms nipple 140 and/or interacts with handlebar body 98 to secure dampener body 150 relative thereto.

Regardless of the securing methodology, each dampener 108, 110 is preferably constructed of an elastomeric or rubber-type material whereas body 98 of handlebar assembly 12 is formed of a more rigid material, such as a metal, like steel or aluminum based materials, and/or carbon fiber material. Preferably, body 98 is formed of aluminum or carbon fiber and dampeners 108, 110 are formed of a more pliable and resilient material having durometer values between about A25, a durometer value comparable to a rubber band, and about A55, a durometer value comparable to a door seal. Understandably, dampeners 108, 110 could be provided with higher and lower durometer values as a function of the intended use of the underlying bicycle, if a supplemental grip assembly is intended to be used with the handlebar assembly, and an amount of vibration dampening desired and/or tolerable to satisfy rider preferences.

Preferably, dampeners 108, 110 have a shore durometer hardness value in the range of about A25 to A35. More preferably, the properties of dampeners 108, 110 are selected to as to adequately dampen vibration of the underlying handlebar and to cooperate with any of a number of grip methodologies common to the shape of the bar. Said in another way, dampeners 108, 110 are preferably formed of a pliable material that can withstand the interaction associated with a grip, in the form of either tape or a grip assembly being positioned over the dampener.

Additionally, when only close tolerance is provided between a dampener and a supplemental grip assembly, lubrication or one or more assembly steps, such as air blowing, introduction of water, applying a release agent to the dampener, using a talc based lubricant such as a talcum powder between interfitting parts, and/or altering the material of the dampener to have a higher durometer value, or decreasing the elasticity of the dampener may be taken to assist in a properly positioning a supplemental grip assembly with respect to the handlebar assembly without unduly detracting from performance of the dampener. Of the above, the use of talc material seemed to be most beneficial whereas air blowing, although still workable, seemed to be less beneficial with respect to assembling an exemplary handlebar assembly with an overlying or supplemental grip assembly.

Preferably, the material of dampeners 108, 110 are not formed of oil based materials if glue or double sided tape is utilized as insert 144 and intended to attach the dampener to the bar as the oil may detract from desired adhesion between the dampener and the underlying bar. Dampener's 108, 110 dampen vibration of body 98 of handlebar assembly 12. As such, dampeners 108, 110 reduce the transmission as well as the concentration magnitude of vibrations of handlebar body 98 that are communicated to the hands of a rider. Accordingly, handlebar assembly 12, even without supplemental grips such as tape or palm grip assemblies as explained further below, reduces the vibrations the hands of the rider must withstand.

As explained further below with respect to FIGS. 17 and 18, although handlebar assembly 12 is commonly referred to as a straight bar, even though it does not have a perfectly linear shape, it is appreciated that the vibration dampening of the handlebar assembly 12 of the present invention is applicable to handlebar configurations other than the generally "straight" handlebar configuration shown in FIGS. 2 and 6. That is, it is appreciated that body 98 could be provided in virtually any shape and constructed to include more than two channels and corresponding dampeners. As explained further below, FIGS. 17 and 18 show a road bike bar that includes multiple left hand and multiple right hand grip sites. It is understood that this is but another individual but common shape of bicycle handlebars. It is appreciated that handlebar assembly 12 could have virtually any shape and any number of discrete grip sites intended to be gripped by a user.

FIGS. 2-5 and 8-13 show various supplemental or optional grip assemblies that are configured to cooperate with handlebar assembly 12 as described above. Referring to FIGS. 4-9, in a first embodiment, each optional grip assembly 100 includes a core 200, a grip pad 202 that is positionable about the core 200, an inboard clamp 204, an outboard clamp 206, and an end cap 208. As used herein, like handlebar assembly 12, the inboard and outboard directions refer to the orientation of the respective components of grip assemblies 100 with respect to a longitudinal axis of bicycle 10. Said in another way, inboard structures are located nearer the longitudinal axis of bicycle 10 than outboard structures.

Figure 9:
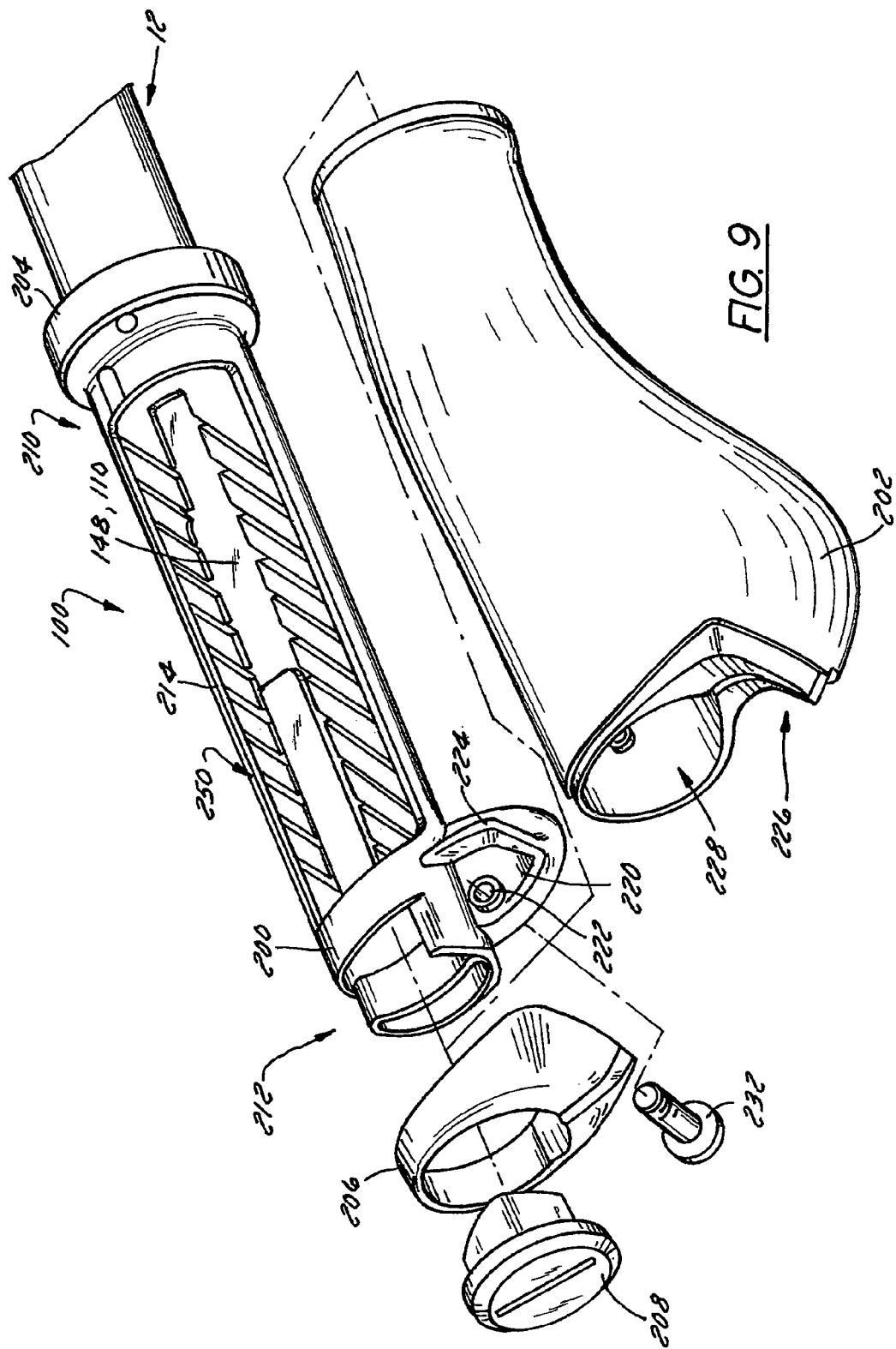
FIG. 9 is a partial exploded view of the handlebar and grip assembly shown in FIG. 2.
Figure 10:
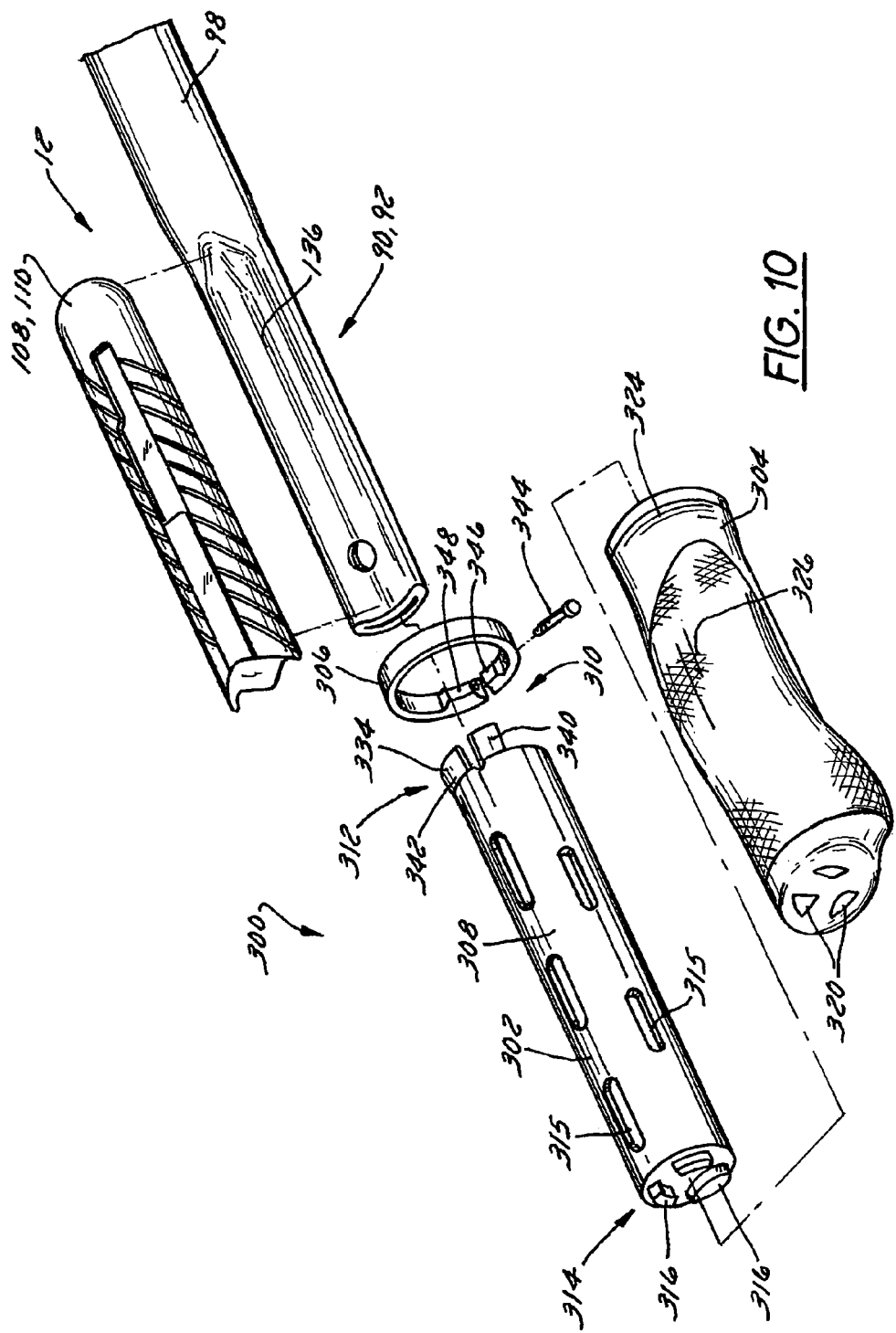
FIG. 10 is an exploded view of another handlebar grip assembly useable with the handlebar assembly shown in FIG. 1.
Figure 11:
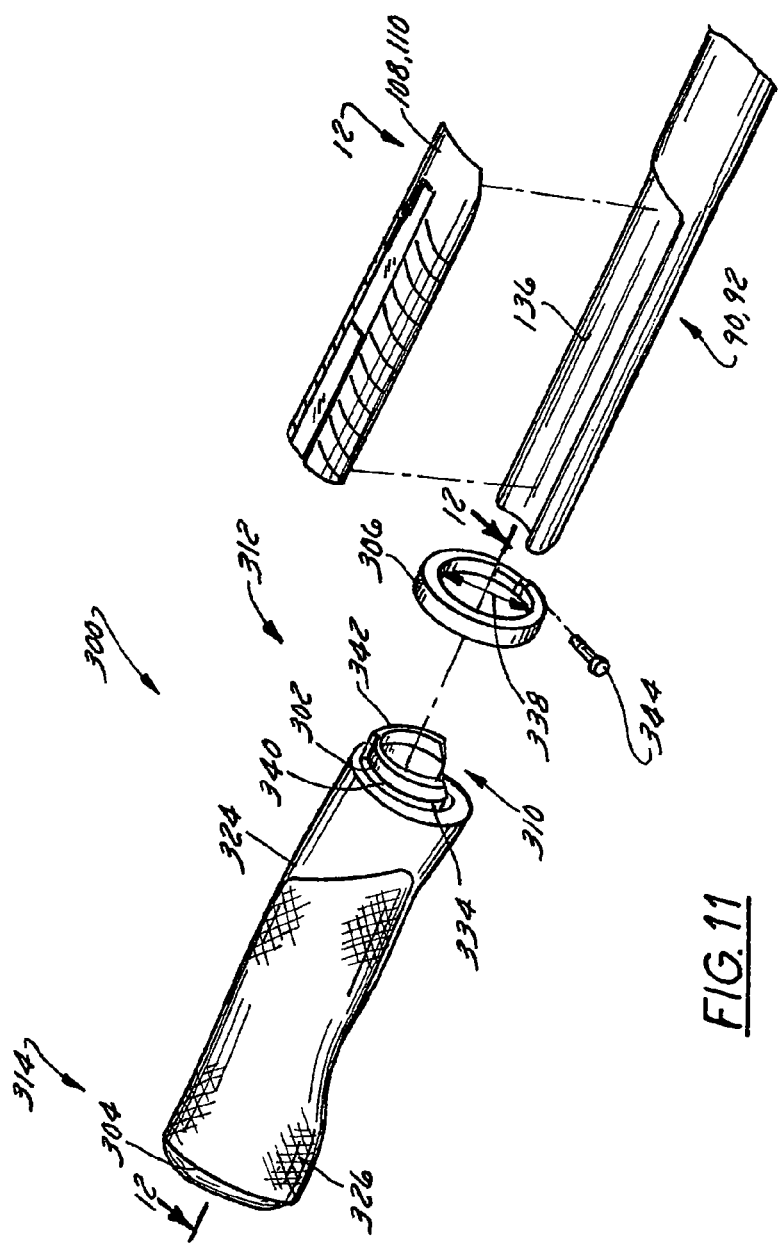
FIG. 11 is partial exploded view of the handlebar and grip assembly shown in FIG. 9.
Figure 12:
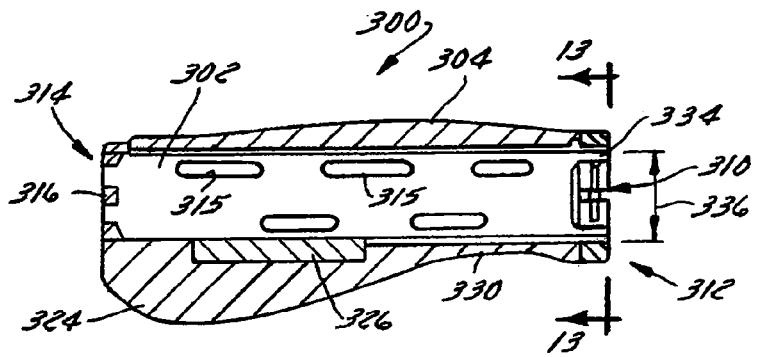
FIG. 12 is cross-sectional view of a grip and grip sleeve of the grip assembly taken along line 12-12 shown in FIG. 11.
Figure 13:
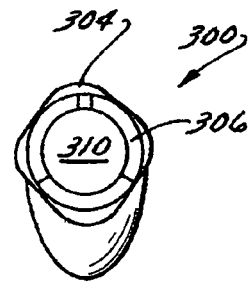
FIG. 13 is an elevational view of the grip assembly shown in FIG. 12 in the direction of line 13-13 shown in FIG. 12.

Core 200 includes an inboard end 210 that cooperates with inboard clamp 204 and an outboard end 212 that cooperates with outboard clamp 206. Core 200 includes a window or opening 214 that extends in a longitudinal direction along a substantial portion of core 200. As shown in FIG. 9, when core 200 is engaged with body 98 of handlebar assembly 12, opening 214 overlies and exposes all or a substantial portion of the hand side 154 of the dampener 108, 110 positioned therebehind. As explained further below, such a construction allows the vibration or oscillation dampening performance of handlebar assembly 12 to augment the vibration or oscillation dampening performance attributable to grip assembly 100.

Figure 8:
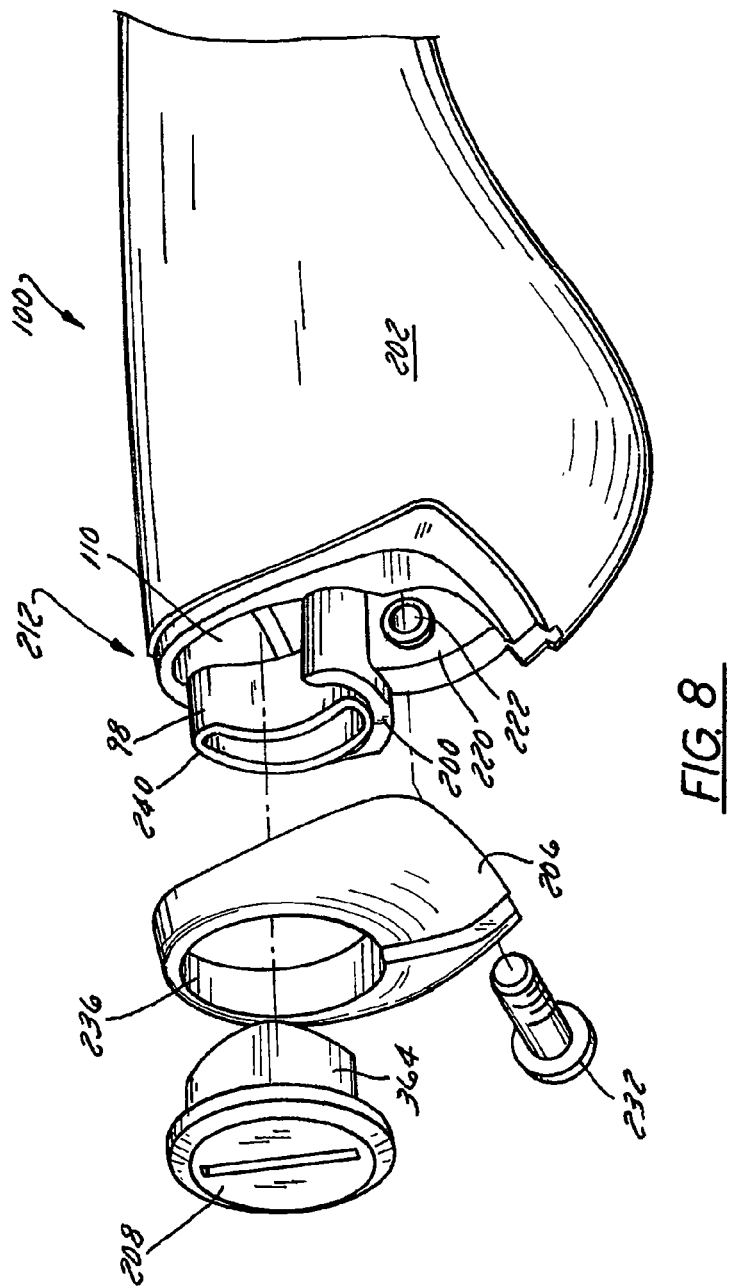
FIG. 8 is detailed view of a clamp assembly portion of the grip assembly shown in FIG. 2.

An ear 220 extends in a radially outward direction from core 200 near outboard end 212 of core 200. Ear 220 includes an opening 222 and at least one rib 224 that is positioned inboard along ear 220 relative to opening 222. Ear 220 and rib 224 cooperate with a cavity 226 formed in grip pad 202 to index grip pad 202 with respect to core 200 and handlebar assembly 12. Grip pad 202 includes another internal cavity 228 that fluidly communicates with cavity 226 and is constructed to snuggly overlie the generally cylindrical portion of core 200. As shown in FIG. 8, a distal outboard end of handlebar body 98 is exposed near an outboard end of grip assembly 100. Outboard clamp 206 and end cap 208 cooperate with handlebar body 98 and core 200 of grip assembly 100 so as to support the outboard end of grip assembly 100 with respect to handlebar body 98.

Each of inboard and outboard clamps 204, 206 are formed as split rings constructed to cooperate with a respective fastener 230, 232 so that tightening of the respective fastener 230, 232 compresses the respective clamp 204, 206 about body 98 of handlebar assembly 12. As shown in FIG. 8, fastener 232 associated with outboard clamp 206 also passes through opening 222 formed in ear 220 of core 200. Tightening of fastener 232 biases a radially inward directed surface 236 of clamp 206 into engagement with end cap 208 and an outwardly directed surface 240 of the distal end of handlebar body 98. The generally noncircular cooperation of end cap 208 with the channel 136 formed in handlebar body 98 and clamp 206 with ear 220 of core 200 provides a generally smooth aesthetically and textually pleasing, yet rigid and robust, connection at the outboard end of grip assembly 100 with handlebar assembly 12.

Preferably, core 200 of grip assembly 100 is formed of a fairly robust and generally non-deformable material such as metal and/or a rigid plastic material. Comparatively, grip pad 202 is formed of a fairly pliable and somewhat deformable or elastic material. Grip pad 202 further reduces and at least partially isolates a rider from vibrations of handlebar body 98 that may be communicated to grip pad 202 via the interaction with core 200 of grip assembly 100. It should be appreciated that a handlebar assembly equipped with a supplemental grip assembly such as grip assembly 100 provides a larger surface area for interaction with a palm area of a hand of a rider as compared to direct rider interaction with handlebar assembly 12 without any such supplemental handlebar grip assembly.

When considered in conjunction with handlebar assembly 12, grip pad 202 and dampener 110 each contribute to dampening of vibrations communicated to the hands of a rider. Furthermore, the cavity defined by opening 214 of core 200 of grip assembly 100 provides a space 250 between grip pad 202 and dampener 110 that allows inward deflection of grip pad 202 toward dampener 110 during radially inward directed loading of grip assembly 100 via interaction with the hand of the rider. Such a construction provides a grip pad vibration or suspension performance further reduces or limits operational vibrations communicated to the hands of the rider. Such a benefit can be augmented by combining the shock or vibration dampening performance of both grip assembly 100 and handlebar assembly 12. Said another way, that portion of grip pad 202 that generally underlies the rider's palm is allowed to deflect inward relative to core 200 toward dampener 110 thereby reducing the magnitude of the impact vibrations communicated to the hand of the rider. Accordingly, handlebar assembly 12 and grip assembly 100 each contribute to dampening or reducing handlebar vibrations that would otherwise be communicated to a rider. Accordingly, each of handlebar assembly 12 and grip assemblies 100 individually improve rider experience, decrease rider fatigue associated with standing handlebar vibration and tend to enhance a rider's interaction with the underlying bicycle.

FIGS. 10-13 show another grip assembly 300 that is configured to cooperate with handlebar assembly 12. For convenience only the left hand handlebar and grip assembly is shown although it should be appreciated that the right hand assembly would be provided in a generally mirror image construction of the left hand assembly. Grip assembly 300 includes a sleeve or core 302, a grip body 304, and a clamp ring 306 that secures core 302 at a respective location on handlebar assembly 12.

Core 302 includes an elongate body 308 that defines an interior chamber 310 and is shaped to slidably cooperate with handlebar assembly 12. Elongate body 308 includes a generally open inboard end 312 and a substantially or completely closed outboard end 314. Preferably, outboard end 314 is constructed to not allow passage of handlebar assembly 12 completely through core 302. A number of optional passages 315 can be formed through core 302 along one or more of the longitudinal or circumferential length of core 302. Alternatively, core 302 could be solid bodied and/or shaped to have a window or passage similar to opening 214 of grip assembly 100.

A number of bosses 316 are formed on outboard end 314 of core 302 and extend in an outward direction therefrom. Bosses 316 are shaped, and oriented to cooperate with a corresponding configuration of cavities 320 formed on an outboard end 322 of grip body 304. Grip body 304 is formed as an elongate shape and slidably cooperates with core 302. Preferably, grip body 304 is formed of a first material 324 and a second material 326 that is a different durometer value than materials 324. Preferably, first material 324 is less pliable or more rigid than second material 326. Preferably, second material 326 is generally positioned in that area of grip body 304 that underlies a majority of the hand or palm of a rider during interaction with grip assembly 300.

Regardless of the number and types of material that compose body 304, an interior surface 330 of grip body 304 is preferably shaped to cooperate with core 302 in a slidable but highly frictional manner. That is, it is envisioned that body 304 must be forced over core 302 with the assistance of one or more tools and/or lubricants but once positioned thereover, body 304 is positionally fixed with respect to core 302 when subjected to interaction with the hand of a rider during even aggressive riding. It is further envisioned that interior surface 330 of grip body 304 include one or more projections that cooperate with one or more of the passages 315 formed in core 302 when grip body 304 is positioned thereover. Such interaction further resists translation of grip body 304 relative to core 302 during use of grip assembly 300.

Inboard end 312 of core 302 includes a clamp flange 334 that, when grip body 304 is fully engaged with core 302, extends beyond an inboard most edge of grip body 304. Clamp flange 334 has a width, indicated by arrow 336, which generally corresponds to a width, indicated by arrow 338, of clamp ring 306. Flange 334 includes a first ear 340 and a second ear 342 that are positioned between clamp ring 306 and handlebar assembly 12. A fastener 344 cooperates with opposite ends 346, 348 of clamp ring 306 and can be adjusted to manipulate an interior diameter, indicated by width arrow 338 (FIG. 11), of clamp ring 306. Reducing diameter 338 of clamp ring 306 by tightening fastener 344 compresses flange 334 of core 302 into secure engagement with handlebar assembly 12.

Preferably, flange 334 overlies a portion of dampener 108, 110 of handlebar assembly 12 to isolate, limit, or reduce the amount of vibration of handlebar body 98 communicated to grip assembly 300. Additionally, the snug interaction between the outboard end of handlebar assembly 12 and the outboard but radially interior end of core 302 provides a robust but isolated interaction and connection between grip assembly 300 and handlebar assembly 12. Furthermore, the outboard end interaction of core 302 and grip body 304 provides an aesthetic appearance to the termination of the combined handlebar and grip assembly that does not require a termination cap common to many such grip assemblies, including for instance, grip assembly 100 and cap 16 shown in FIG. 16.

Figure 16:
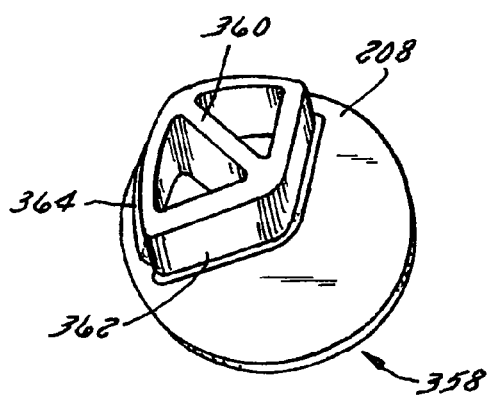
FIG. 16 is a perspective view of an end cap of one of the handlebar grip assemblies shown in FIG. 2.

FIG. 16 shows termination or end cap 208 usable with grip assembly 100 and/or other grip assemblies with handlebar assembly 12. Cap 208 includes a terminal face 358 that faces in an outboard direction when cap 208 is engaged with a grip and handlebar assembly. Cap 208 includes a projection 360 that extends in an "inward" direction or a direction toward handlebar bar assembly 12 when a corresponding grip assembly, such as grip assembly 100, is engaged therewith. Preferably, projection 360 includes a contoured surface that includes a first portion 362 that generally corresponds to the shape of a terminal or end portion of channel 136 and a second portion 364 that completes or compliments the generally circumferential cross-sectional shape of handlebar assembly 12 proximate an outward facing end of dampeners 108, 110. Cap 208 completes the aesthetic appearance of handlebar and grip assembly 12, 100 and, when used with grip assembly 100 cooperates with clamp 206 to provide 360 degree securable interaction with the terminal end of handlebar body 98. Understandably, handlebar assembly 12 is useable without supplemental grip assemblies such as grip assemblies 100, 300 as well as other conventional grips assemblies. Cap 208 can be configured to cooperate with a respective grip assembly and handlebar assembly 12 and/or wholly omitted when handlebar assembly 12 is used with self supporting or terminating grip assemblies like grip assembly 300.

FIGS. 17 and 18 show another handlebar assembly 380 according to the present invention. Those skilled in the art should readily appreciate handlebar assembly 380 as a handlebar assembly generally applicable for use with road bikes as evidenced by the substantially curvilinear shape of the handlebar assembly. It is appreciated that the "straight" bar shape of handlebar assembly 12 and the curvilinear shape of handlebar assembly 380 are merely two examples of many different shapes that handlebar assemblies 12, 380 could be provided.

Unlike handlebar assembly 12 which includes what is commonly referred to as a "straight" bar shape and has only one left hand and one right hand grip site or grip location regardless of supplemental grip assemblies, handlebar assembly 380 includes a pair of upper grip sites 382 and a pair of lower grip sites 384. Those skilled in the art will appreciate that upper grip portions or sites 382 are commonly associated with the location of the hands of a rider in up-tight position and grip portions 384 are commonly associated with the location of the hands of a rider in a tucked riding position.

Handlebar assembly 380 includes a body 388 that is shaped to define the general shape of handlebar assembly 380. Body 388 is formed a fairly rigid material such as a fiber or metal material similar to those disclosed above with respect to the handlebar assembly 12. Handlebar assembly 380 includes a number of channels 390 and a corresponding number of dampeners 392 that are positioned in each channel 390. Dampeners 392 cooperate with channels 390 in any of the matters disclosed above with respect to handlebar assembly 12. A grip, such as a wrap 393, is wound about body 388 and dampeners 392 and generally isolates handlebar assembly 380 from direct contact with the hands of a rider. An optional cap 396 is engaged with the opposite ends 398, 399 of handlebar assembly 380 and enhances the aesthetic appearance of handlebar assembly 380. In some applications, cap 396 may also secure the opposite terminal ends of a grip such as wrap 392.

Like handlebar assembly 12, dampeners 392 are constructed of a more pliable material that the material of body 388 and reduces or limits the communication of vibrations of handlebar body 388 to the hands of a rider. Preferably, dampeners 392 have durometer values and ranges similar to those discussed above with respect to handlebar assembly 12. Accordingly, handlebar assembly 380 includes multiple right and multiple left hand grip sites where a rider can interact with handlebar assembly 380 and be exposed to a negligible or limited amount of the vibration of handlebar body 388. Accordingly, handlebar assemblies 12, 380 reduce rider fatigue attributable to interaction the handlebar of a bicycle. Equipping handlebar assemblies 12, 380 with the optional and supplemental grip assemblies 100, 300 further reduces or limits the communication of handlebar vibration to the rider while still allowing robust securing the respective grip assembly to the underlying handlebar assembly.

FIG. 19 is a graphical representation of testing data acquired with two different grip assemblies secured to a straight handlebar assembly without any supplemental dampeners (shown on the left) and the same grip assemblies secured to handlebar assembly 12 (shown on the right). Comparing the images on the left to the images on the right of FIG. 19 shows that, regardless of the grip assembly, handlebar assembly 12 allows a greater distribution of the forces associated with gripping of the dampened handlebar and grip assembly (shown on the right) as compared to the undampened handlebar and grip assemblies (shown on the left).

Referring to the left hand images of FIG. 19, with an undampened handlebar body, a majority of the force associated with interaction with the handlebar is focalized at a palm area 400 of a rider. As shown in the images at right, a substantial portion of the forces associated with interaction with the hand of the rider in handlebar assembly 12 is dispersed over a greater portion of the total area of the hand. Specifically, a substantial portion of the maximum forces experienced by the palm translate toward the area of the grip that overlies dampener 108, 110 or toward a location 402 of the palm nearer the fingers. The distribution of the forces over a larger area of the palm reduces the magnitude of the forces that any one area of the hand must withstand and thereby improves rider endurance. Said in another way, fatigue of the hands of the rider is reduced with use of handlebar assembly 12 as compared to a handlebar having a corresponding shape but no dampeners and at least partially independent of the grip assembly.

During testing it was shown that handlebar assembly 12 reduced the average maximum pressure associated with interaction with the handlebar and grip assembly by approximately 25 kPa between the grips and handlebar assembly shown in the left images of FIG. 19 and the grips and handlebar assembly shown in the right images of FIG. 19. Accordingly, a rider of a bicycle equipped with handlebar assembly 12, 380 and assumably any supplemental grip assembly, including grip assemblies 100, 300 as disclosed above, will be subjected to lower magnitude maximum pressures over the duration of a ride experience as compared to similarly shaped handlebars. Accordingly, handlebar assemblies 12, 380 and grip assemblies 100, 300 individually provide a user with secure interaction with the steerable structure of the bicycle in a manner that reduces the undesirable transmission of handlebar vibration to the hands of the rider.

Therefore, a bicycle handlebar assembly according to one embodiment of the invention includes a body that extends between a first distal end and a second distal end and is formed of a first material. A first grip portion and a second grip portion are formed toward opposite ends of the body. A clamp portion is formed between the first grip portion and the second grip portion and is constructed to engage a steerer clamp. A channel is formed along a portion of at least one of the first grip portion and the second grip portion and a dampener is disposed in the channel and formed of a material that is more pliable than the first material.

Another embodiment of the invention that includes or is combinable with one or more of the aspects of the above embodiments includes a bicycle handlebar assembly having a first grip portion and a second grip portion that is offset from the first grip portion. The assembly includes a center portion that longitudinally spaces the first grip portion and the second grip portion and is constructed to be secured to a steerer tube.

A detent extends along a portion of at least one of the first grip portion and the second grip portion and a vibration dampener is disposed in the detent and shaped to cooperate with the detent to provide a generally continuous cross-sectional shape along a longitudinal length of a respective grip portion.

Another embodiment of the invention that includes or is combinable with one or more of the aspects of the above embodiments includes a bicycle grip assembly having a core with a passage constructed to overly a handlebar. The grip assembly includes a first clamp that supports one end of the core and a second clamp that supports a second end of the core. The first clamp and the second clamp cooperate to secure the core to the handlebar. A grip body that is formed of an elastomer material overlies a majority of the core and an opening is formed in a portion of the core that exposes an inner face of an upward directed portion of the grip body to the handlebar.

Another embodiment of the invention that includes or is combinable with one or more of the aspects of the above embodiments includes a method of isolating a bicycle rider from handlebar vibration. The method includes forming a handlebar that is securable to a bicycle and shaped to be gripped by a user. At least one detent is formed in the handlebar proximate at least one area of common interaction with a hand of a user of a bicycle. The detent is populated with a dampener that is formed of material that is more pliable than a material of the handlebar.

The present invention has been described in terms of the preferred embodiment, and it is recognized that equivalents, alternatives, and modifications, aside from those expressly stated, are possible and within the scope of the appending claims.

What is claimed is:

1. A bicycle handlebar assembly comprising:
   a first grip portion;
   a second grip portion offset from the first grip portion;
   a center portion connecting an inboard end of each of the first grip portion and the second grip portion and longitudinally spacing the first grip portion and the second grip portion, the center portion constructed to be secured to a steerer tube;
   a detent extending along a portion of at least one of the first grip portion and the second grip portion;
   an elastomeric vibration dampener disposed in the detent and extending in a longitudinal direction along a longitudinal length of a respective grip portion; and
   a grip secured over at least one of the first grip portion and the second grip portion
   wherein:
      an exposed surface of the elastomeric vibration dampener is substantially continuous with an exposed surface of a respective at least one of the first grip portion and the second grip portion, and
      the grip further comprises a sleeve and a pad positioned over the sleeve.

2. The bicycle handlebar assembly of claim 1, wherein the first grip portion, the second grip portion, and the center portion are formed as a continuous body of a metal material or a carbon fiber material.

3. The bicycle handlebar assembly of claim 1, wherein the grip is further defined as a wrap that is wound around each of the first grip portion and the second grip portion.

4. The bicycle handlebar assembly of claim 1, wherein the first grip portion and the second grip portion each include more than one grip area to be gripped by a hand of a rider.

5. The bicycle handlebar assembly of claim 4, wherein at least one of the first grip portion and the second grip portion have a curvilinear shape.

6. A bicycle grip assembly comprising:
   a core having a passage constructed to overlay a handlebar;
   a first clamp that supports one end of the core and a second clamp that supports a second end of the core, the first clamp and the second clamp cooperating to secure the core to the handlebar;
   a grip body overlaying a majority of the core, wherein the grip body includes a first elastomer material and a second elastomer material; and
   an opening formed in a portion of the core that exposes an inner face of an upward directed portion of the grip body to the handlebar;
   wherein:
      at least a portion of the opening is aligned with the second elastomer material;
      the second elastomer material is more pliable than the first elastomer material; and
      the opening in the core is shaped and oriented to expose a dampener, attached to the handlebar, to the inner face of the grip body.

7. The bicycle grip assembly of claim 6, wherein the dampener is formed of an elastomer material.

8. The bicycle grip assembly of claim 7, wherein the dampener and the grip body are formed of elastomer materials that have different modulus of elasticity.

9. The bicycle grip assembly of claim 6, wherein each of the first clamp and the second clamp are split rings and include a fastener that compresses each split ring into engagement with the handlebar.

10. The bicycle grip assembly of claim 9, wherein one of the fasteners passes through an opening formed in an ear of the core that extends in an outward radial direction relative to a longitudinal axis of the core.

* * * * *